Patented Sept. 4, 1951

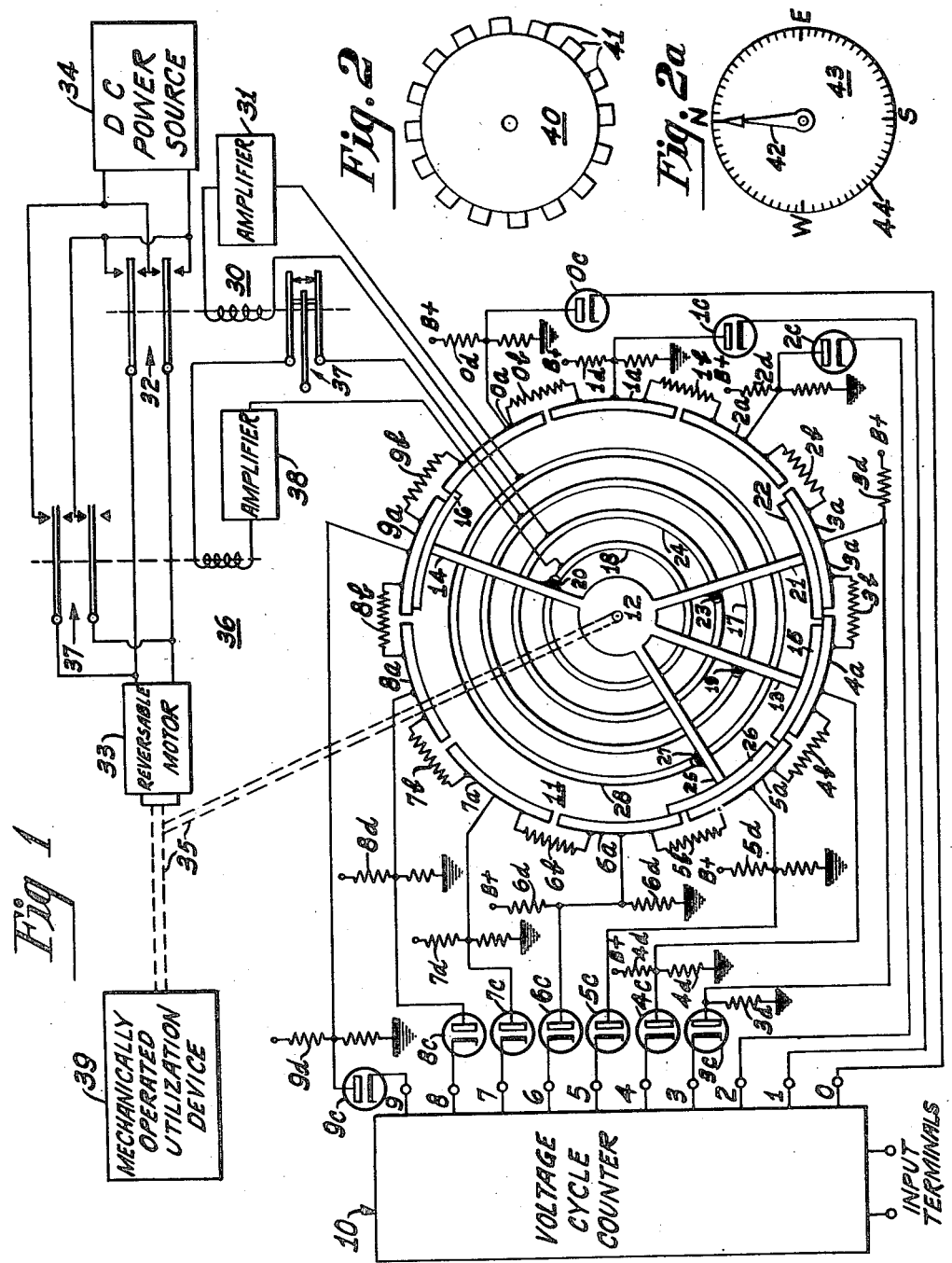

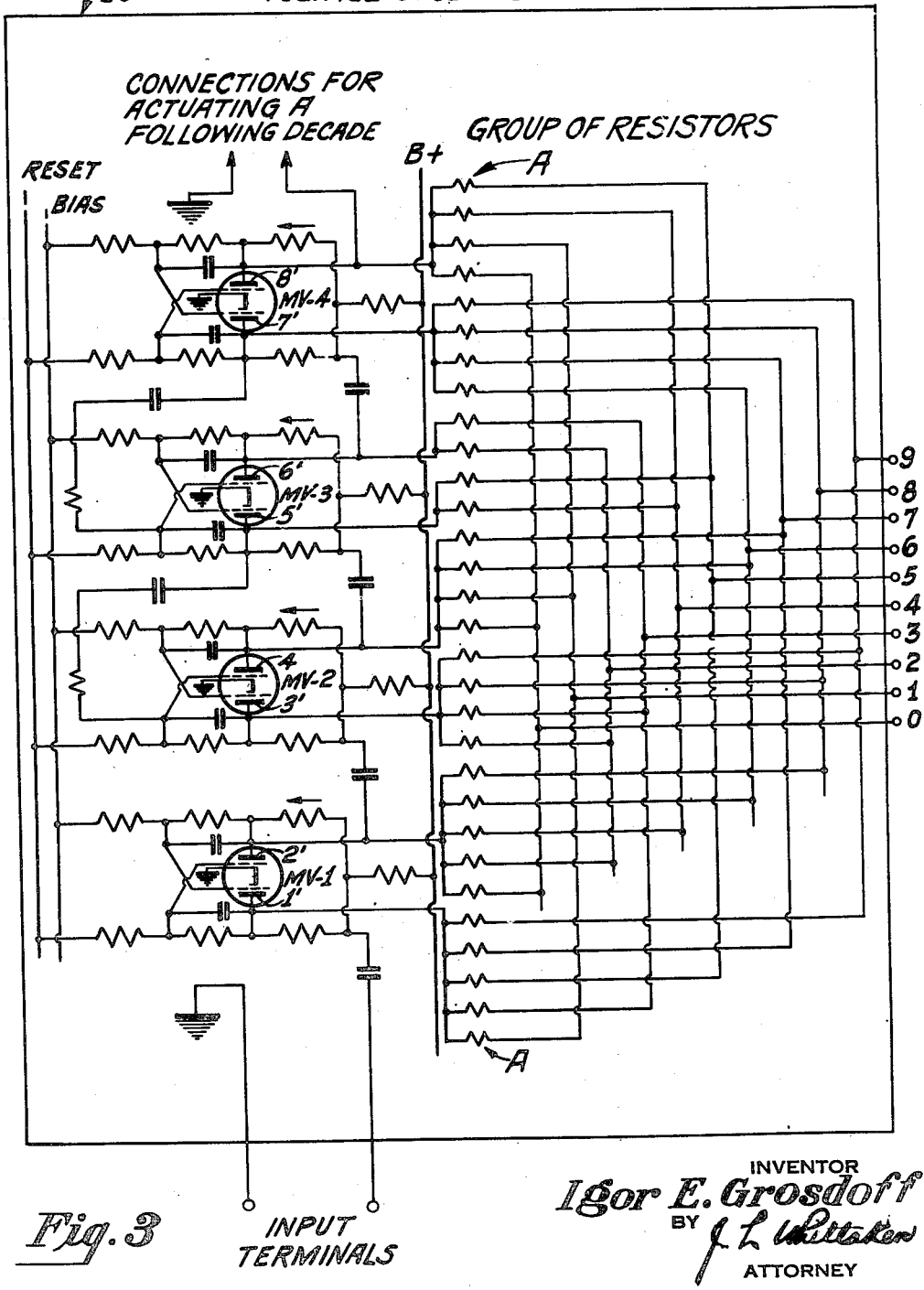

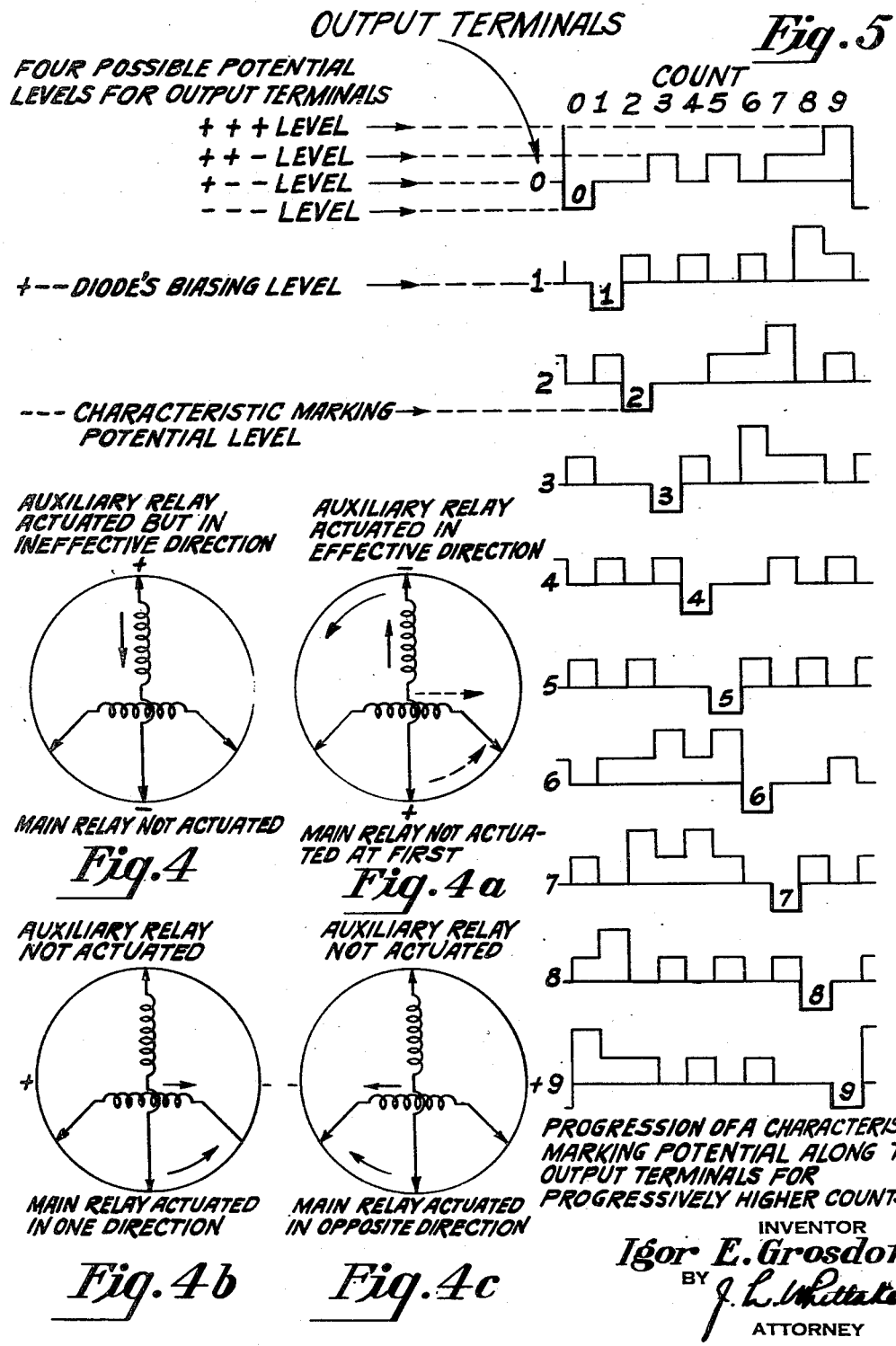

2,566,831

UNITED STATES PATENT OFFICE 2,566,831

ELECTRONIC COUNTER

Igor E. Grosdoff, Princeton, N. J., assignor to Radio Corporation of America, a corporation of Delaware Application February 1, 1949, Serial No. 73,884

10 Claims. (Cl. 318—33)

The present invention relates to electronic counters. More particularly, it relates improvements therein including a device for controlling a mechanical utilization device with the output of an electronic counter.

There are circuits, well known in the art, which operate to count cycles of input voltages received by them, such as cycles of sinusoidal voltages, pulses of periodic trains thereof, or sequential pulses occurring at random intervals. Some circuits of this type are shown and described in my co-pending application Serial No. 666,472 filed on May 1, 1946, now Patent No. 2,493,627. Such a circuit may include a number of output terminals each of which represents a digit or a multiple or submultiple of a digit which multiple or submultiple, in a decimal system, will be some multiple of ten. After the circuit counts a number of cycles of input voltage it produces a characteristic potential to mark the appropriate terminal representing that number. In some counters the characteristic potential is utilized for lighting an indicator lamp which is associated with that terminal and illuminates an overlay to produce a luminous display of the digit.

However, for certain purposes, it is desirable to utilize the position of the marking potential (on a particular terminal) to control a mechanical utilization device. For example, consider a telecommunication system in which the various letters of the alphabet may be represented by different trains of voltage cycles (each including a different number of cycles to represent a different letter). If an electronic counter be employed at the receiving station it would be as desirable to employ in conjunction therewith a mechanical device, such as a type-wheel, which could be rotated to place in operating position type-die of a particular letter represented by any transmitted number of cycles.

Or consider a type of direction finding system well known in the air navigation art. In it a ground station transmits signals in a directive beam with which it azimuthally scans a service area. In addition, each time that the directional beam is pointed in a particular reference direction, such as north, the ground station transmits (omnidirectionally) a timing pulse. In a mobile craft the timing pulse enables an electronic counter which begins to count the cycles of a periodic voltage which is locally produced on the craft and has a frequency exactly related to the azimuthal scanning rate of the directional beam. A receiver aboard the mobile craft is responsive when it first receives directive transmissions, i. e., when the nearest edge of the beam reaches the mobile craft, to reduce the frequency of the locally generated periodic voltage to one-half and is thereafter responsive when it ceases to receive directive transmissions, i. e., when the farthest edge of the beam passes beyond the craft, either to disable the counter or to shut off the periodic voltage source. In this way, the counter will indicate a number of cycles which number will represent the angle subtended between the reference direction, such as north, and the center axis of the directive radiations when it is pointed at the receiving antenna of the mobile craft. It may be desirable for such a system that the output of the electronic counter control a mechanical utilization device such as a bearing indicator having a needle rotatable about a circular scale calibrated according to the points of the compass or in degrees or mills. Obviously, the mechanical utilization device may be adapted to go beyond the simple function of indicating bearing. For example, it may operate an automatic pilot or other suitable equipment to guide the mobile craft according to the bearing angle information.

It is an object of the present invention to devise a device responsive to the output of an electronic counter to control a mechanically operating utilization device.

Other objects, features and advantages of the present invention will be apparent to those skilled in the art from the following detailed description of an illustrative embodiment and from the drawing in which:

Figure 1 is a representation of one embodiment of the present invention;

Figures 2 and 2a represent particular mechanically operating utilization devices controllably by the device of the present invention;

Figure 3 shows the circuit of a known electronic counter circuit adapted for use with the device of the present invention;

Figures 4, 4a, 4b and 4c are diagrams illustrating the principle of operation of the present device; and Figure 5 is a chart showing the voltage levels individually appearing on the 10 terminals of the counter circuit (Figure 3 or block 10 of Figure 1) after it has counted any number of cycles of input voltage between one and ten, and indicating how for any counted number of cycles between one and ten only one of the terminals has a potential below a certain reference level.

Where the same elements appear in more than one figure of the drawing they are represented by the same reference numerals.

In Figure 1 block 10 represents an electronic counter which may be of the type more fully shown in Figure 3. In the example herein the counter has 10 output terminals 0, 1, 2–9, and is able to count any number of cycles from one to ten. The number of output terminals may be increased or decreased according to the requirements of any particular situation. For example, if the device of the present invention is used for controlling a bearing indicator the scale of which is divided by 36 calibrations into increments of ten degrees the electronic counter may be expanded accordingly to the principles set forth in the above-mentioned co-pending application to have 36 output terminals, or if desired, a ten-terminal counter, such as counter 10, may be fitted into a decimal system wherein it counts the digits of the decimal system (and, as will be shown herein, sets a mechanical utilization device to represent them) and wherein, in addition, it produces one output voltage cycle for each full count of ten to actuate a second ten-terminal counter, i. e., a following "decade," which counts the tens of cycles and sets a second mechanical utilization device according to the present invention.

An automatic selector switch 11 has ten circumferentially positioned contacts $0a$, $1a$, $2a$–$9a$ each of which is connected to a different one of the output terminals, 0–9, of the counter 10.

Preferably, but not necessarily, successive ones of the terminals 0–9 should be connected respectively to selector switch contacts which occur sequentially around the circumference of the switch 11. The contacts $0a$–$9a$ are mounted around the circumference of switch 10 with insulation, such as air, between them so that adjacent ones do not make low impedance contact with each other. However, each contact is connected over a high impedance element to the contact adjacent to it on each of its two sides. The high impedance elements shown in Figure 1 are 10 resistors $0b$, $1b$–$9b$, all of which preferably have the same value of resistance.

The connection between each of the terminals 0–9 and its corresponding selector switch contact $0a$–$9a$ is made over a different one of a group of 10 diodes $0c$–$9c$ which is connected with its cathode side toward the counter. The anode of each of the diodes $0c$–$9c$ is positively biased by connection to a respective one of ten biasing voltage dividers $0d$–$9d$, each of which is grounded on its lower end; is connected to a source of positive voltage, B+, at its upper end; has an intermediate point connected to the diode anode. This bias level is equivalent to the voltage level which is obtained at a junction point to which each of the anodes of a preselected three tubes of the decade counter 10 are connected through equal individual resistors when the voltages at two of the anodes are reduced below B+ because the tubes in which they are included are drawing current and the third anode is at or near B+ because the tube in which it is included is cut off. Because of this, this bias level will be referred to herein as the level +—— .

It will be seen that whenever the counter circuit 10 has counted a number of voltage cycles within its counting range each of its output terminals 0–9 will be at one of four possible potential levels to be explained more fully hereinafter. Two of these possible potential levels will be above the +—— bias level and will be referred to herein as +++ and ++—; one of them will be the bias level +——; and one of them below it, i. e., level ———. Each (—) in the designation of a possible level for a terminal means that the terminal is connected to the anode of a multi-vibrator tube which is drawing current and each (+) means that it is connected to the anode of a tube which is cut off. After any count of a particular single terminal, and no other, will be marked with the level ——— and that terminal will represent the number counted.

It is apparent from the arrangement shown in Figure 1 that all of the diodes $0c$–$9c$, except the one connected to a terminal marked with the ——— potential, will have their cathodes more positive than their anodes and therefore will introduce infinite impedances between the unmarked output terminals and their respectively corresponding selector switch contacts. In the one case of the marked terminal the diode-cathode will be below the +—— bias level of its anode and therefore current will flow from ground through the lower resistor of its biasing bleeder (one of the $0d$–$9d$ bleeders) through the diode and into the counter circuit, thus dropping the potential of the corresponding contact (one of the $0a$–$9a$ contacts). Since all of the $0a$–$9a$ contacts are interconnected by the resistors $0b$–$9b$ and since each of them is connected to ground over the lower resistor of its associated biasing bleeder, there will be ten parallel ground return paths contributing to the flow of current from the marked selector switch contact toward the counter circuit. This will produce two symmetrical voltage gradients around opposite sides of the circle of selector switch contacts from the marked contact (most negative) to the contact positioned oppositely to it in the ring (least negative). On each side successive contacts between the marked one and the opposite one will be progressively less and less negative. It is upon the existence and angular orientation of this gradient that the operation of the present device depends.

Selector switch 11 comprises a rotatable hub 12 which may be of insulating material. Fastened to the hub 12 at their respective inner ends are two oppositely extending radial arms 13 and 14 which carry at their respective outer ends two arcuate brushes 15 and 16. Thus, if the brush carried by one of these two arms is positioned to engage the marked contact, the brush carried by the opposite arm will be positioned to contact the oppositely positioned contact in the circle of the selector switch.

The arms 13 and 14 may be of conductive material, or, if not, they should comprise conductors extending lengthwise of them for electrically connecting the brushes which they carry to respective slip rings 17, 18. The arm 13 is provided with a wiper brush 19 for electrically contacting the slip ring 17 and the arm 14 is provided with a brush 20 for similarly engaging the slip ring 18. Fastened to the hub 12 in a position angularly displaced to one side of the arm 13 in a counter-clockwise direction is a selector arm 21 carrying a selector brush 22 of such size and shape that when the arcuate brush 15 fully engages any of the selector switch contacts, the selector brush 22 will fully engage the selector switch contact adjacent thereto in a counter-clockwise direction. The arm 21 is provided with a slip ring brush 23 for engaging a slip ring 24. Fastened to the hub 12 in a position angularly displaced from the arm 13 on its side opposite to the arm 21 is a second selector arm 25 carrying a selector brush 26 so that when arcuate brush 15 fully engages any of the selector switch contacts, 9₁–9₃, the selector brush 26 will fully engage the selector contact adjacent thereto in a clockwise direction. The selector arm 25 has a slip ring brush 27 cooperating with a slip ring 28. A main relay 30 is connected to the slip rings 24 and 28 over a D. C. amplifier 31. The main relay 30 is a polarized relay operating an arrangement 32 of two armatures and four contacts which comprises a double-pole double-throw switch. The two armatures of the arrangement 32 are electrically connected to a reversible D. C. motor 33 and the four contacts of the arrangement 32 are connected to a D. C. power source 34. These connections are so made, according to well known practices, that when there is a voltage difference between selector brushes 22 and 26 (due to the existence of two potential gradients around opposite sides of the circular selector switch and non-symmetrical positioning of these brushes thereon) the main relay 30 will be actuated to connect the D. C. power source 34 to the reversible motor 33 in either of two polarities (depending on the polarity of the voltage difference) for operating the motor in either of two directions.

A mechanical linkage 35 interconnects the shaft of the reversible motor with the hub 12 of the selector switch 11 so that whenever the motor 33 operates, hub 12 will be rotated and will carry with it the four arms 13, 14, 21 and 25 and with them their associated arcuate brushes (15, 16), selector brushes (22, 26), wiper brushes (19, 20), and slip ring brushes (23, 27). It is obvious that this electro-mechanical system can easily be put together so that for either polarity of a voltage difference which exists between the selector brushes 22 and 26 the hub 12 will be rotated in a direction to move the arcuate brush 15 toward the selector switch contact marked with the potential level — — —.

An auxiliary relay 36 is employed herein because without it there is a one possible condition in which this device would be inoperable. This condition would exist when one cycle of operation, in which the arcuate brush 15 has been positioned on a particular selector switch contact, is followed by another cycle in which the counter 10 upon completing its count happens to mark (with the potential level — — —) the exactly oppositely positioned selector switch contact. In this case there would be no overall potential difference between the selector brushes 22 and 26 because two equal and opposite voltages of opposite polarity would respectively exist between the respective contacts which they engage and the one contact located between them, and these two voltages would oppose and exactly balance each other. The auxiliary relay 36, which is also of the polarized type, has its magnetizing coil connected between the slip rings 17 and 18. It comprises an arrangement 37 of two armatures and four contacts utilized, as shown in Figure 1 so that when the relay is actuated in one direction it is ineffectual, whereas when it is actuated in another direction it applies power from the source 34 to the motor 33 in appropriate polarity to cause it to rotate the hub 12 in the direction to move the selector brushes 22 and 26 into engagement with selector switch contacts which will provide a gradient between them of the proper polarity to operate the main relay 30 to continue the operation of the motor 33 in the same direction.

The main relay 30, in addition to its double-pole double-throw arrangement 32, comprises an auxiliary-relay-disabling arrangement 37 including an armature and two spring arms oppositely deflectable by the armature and respective contacts for the spring arms so that in whichever direction the main relay 30 is operated, the arrangement 37 acts to disable the energizing circuit of the auxiliary relay. Thus, if a cycle of mechanical operation is started by the auxiliary relay 36, it will only retain control over the operation of the motor 33 until the main relay 30 is actuated. Obviously, on the other hand, if a cycle is started by the main relay the auxiliary relay will not be able to assume control during any portion of the same operating cycle. In the embodiment shown herein a D. C. amplifier 38 is included in series with the magnetizing coil of the auxiliary relay 36.

Block 39 represents a mechanically operated utilization device which is actuated synchronously with the hub 12 whenever it is turned by the motor 33. As shown in Figure 2, this utilization device may be a type-wheel 40 which is mechanically rotatable by the electro-mechanical system of the present invention to position it angularly in accordance with a count made by the cycle counter 10 so that other cooperating elements, not shown herein, may be actuated to print a particular letter from a selected one of the type-dies 41 formed in the periphery of the type-wheel 40. Figure 2a shows another type of utilization device, namely, a bearing indicator 43 comprising a pointer 42 and an azimuthal scale 44 cooperating therewith in an obvious manner.

Figure 3 shows the circuit details of an embodiment of a voltage cycle counter (block 10 of Figure 1) adapted for use in the present invention. It comprises four multivibrators MV—1, MV—2, MV—3, MV—4 whose interconnections and internal circuit arrangements are shown and fully described in my co-pending application Serial No. 666,472, now Patent No. 2,493,627 (see Figure 4 of that application and note the four multivibrators MV—1, MV—2, MV—3, MV—4 and the eight anodes 1', 2'–8' thereof which are shown in that figure and correspond to the similarly designated elements of Figure 3 herein). As explained therein, each of the anodes 1'–8' will at any time be at one of two possible potential levels, one an upper level ("+") at or near the level of the source energizing the multivibrators and the other a lower level ("—") well below it. Any anode will assume the upper level when its tube is cut off and the lower level when it is drawing considerable current. For example, as shown in Figure 6d therein, plate 1' alternates between the upper and lower levels five times as the circuit counts from zero cycles up to 9. As shown in Figure 6c therein and as should be expected inasmuch as it is included in the same multivibrator with anode 1', anode 2' is at the low level when plate 1' is at the high level and vice versa. As also appears in Figure 6d of the co-pending application, plate 3' is at the high level after the counting of zero cycles, one cycle, six cycles, or seven cycles, and it is at its low level after the counting of 2, 3, 4, 5, 8 or 9 cycles. As shown in Figure 6A therein, and as should be expected since it is a portion of the same multivibrator as anode 3', anode 4' is at the low level whenever plate 3 is at the high level and vice versa. Similar information about the conditions of plates 5', 6', 7' and 8' appear in Figures 6E, 6C, 6H and 6A. The group of resistors A shown in Figure 3 herein to the right of the heavy vertical line representing a bus wire for supplying B+ to the tubes of the multivibrators are used for connecting each of the terminals 0-9 to a particular combination of three of the anodes 1'-8'. According to principles described in the above-mentioned co-pending application, and illustrated in the Figures 6A-6J and 7 therein, this arrangement results in marking only a particular one of the terminals 0-9, with the — — — marking potential for each completed count as well as in the orderly progression of this potential along the line of contacts from 0 to 9 as successively higher numbers of cycles are counted from 0 (zero) to 9. For example, terminal 5 is connected over re-three individual resistors to the anodes 1', 5' and 8' and therefore for any condition of the circuit, i. e., after it has completed any count up to 9, the potential of terminal 5 will be determined by the potentials of these three plates as combined over the resistors. For a count of five, terminal 5 will be marked with the — — — marking potential, inasmuch as all of the anodes to which it is connected will be at their low levels.

The detailed arrangement counting circuit shown in Figure 3 does not constitute the present invention and therefore need not be described more fully herein. Further description of its principles of operation can be found in another of my co-pending applications, Serial No. 580,446 filed March 1, 1945, now Patent No. 2,521,788.

Figure 5 shows the voltage level produced on each of the terminals 0-9 of a voltage counter of the kind shown in Figure 3: (1) when it has not counted any cycles of input voltage (when it has counted zero cycles); (2) when it has counted one cycle of input voltage; (3) when it has counted two cycles of input voltage; etc., up to nine cycles. It will be seen, for example, that when the voltage counter has counted 5 cycles of input voltage the potential level + + — will appear on the output terminals 0, 2, 7 and 8; the potential level + — — will appear on the terminals 1, 3, 4 and 9; the potential level + + + will appear on the terminal 6; and the potential level — — —, i. e., the marking potential level, will appear only on terminal 5. However, due to the use of the biased diodes 0c–9c in the interconnections between the output terminals of the voltage counter and respective contacts 0a–9a of the selector switch 11, only the marking potential — — — will be transferred from the voltage counter 10 to the selector switch 36 and for any count this will be a potential applied irom only one output terminal to only one contact.

Figures 4, 4a, 4b and 4c schematically represent the manner of cooperation of the main and auxiliary relays 30 and 36 for a number of limiting conditions. In all of these figures a straight arrow represents electrical current; a curved arrow represents hub rotation; and dotted-line arrows represent currents and rotation which take place later than the start of a cycle of operation of switch 11. In Figure 4 the condition is shown in which the selector switch is already properly set for the position of the marking potential applied to it by the counter 10, i. e., a condition arising from the fact that the count made in the preceding cycle of operation was the same one. In this case, there would be no potential difference between the selector brushes 22 and 26 and therefore the main relay would not be actuated. There would be a potential difference across the brushes 15 and 16. However, the polarity of this potential difference would be such as to actuate the auxiliary relay in its ineffectual direction and the overall effect would be that motor 33 would not be operated.

In Figure 4a the condition shown in Figure 4 is changed by a factor of 180°, the marked contact is directly opposite to the position of brush 15. At the outset the main relay would not tend to be energized, as there would be no voltage difference between the selector brushes 22 and 26 (see above explanation of the reason for including the auxiliary relay 36). However, the voltage difference between the brushes 15 and 16 would be such as to operate the auxiliary relay in its effectual direction, thus actuating the motor and rotating the hub 12 in a direction which would progressively reduce the voltage drop across the auxiliary relay but would move the selector brushes 22 and 26 into engagement with contacts between which there would exist a suitable potential difference for operating the main relay in a direction appropriately to actuate the motor to continue the hub movement which was started by the action of the auxiliary relay.

Figure 4b shows a condition 90° different from that of Figure 4 or from that of Figure 4a. In this situation, the auxiliary relay will not be actuated; however, a potenial difference will exist between the selector brushes 22 and 26 and it will be of the polarity for actuating the polarized main relay in a direction to operate the motor to drive the arcuate brush 15 in the direction of the marked selector switch contact. When the main relay operates to do this it will at the same time disable the auxiliary relay which therefore will not operate at all for this particular counting cycle.

Figure 4c shows a situation 180° different from the situation of 4b. In this instance also the auxiliary relay will not be actuated. However, the polarity of the voltage difference between the selector brushes 22 and 26 will be such as to operate the main relay in the opposite direction from that in which it is operated under the conditions of Figure 4b and therefore the hub 12 of the selector switch will be rotated in an opposite direction and again the arcuate brush 15 will move toward the marked selector switch contact.

I claim as my invention:

1. A selector switch arrangement comprising an electrical loop of series-connected alternately-occurring contacts and resistors, the resistors all having substantially the same value, a source of reference potential, a group of second resistors each of which is equal in resistance value to all of the other second resistors and each of which is connected between a different respective one of said contacts and said source of reference potential, means for selectively generating separate potentials including a marking potential, a group of rectifiers, one end of each of said rectifiers being coupled to a respective one of said contacts, the other end of each of said rectifiers being coupled to said means for generating separate potentials to receive one of said potentials, the value of said source of reference potential being selected to permit only said rectifier to which said marking potential is applied to be conductive whereby a marking potential is applied to the contact to which said conductive rectifier is coupled, a pair of selector brushes disposed for simultaneously engaging respective non-adjacent ones of the contacts, and control means responsive to a voltage difference between the brushes due to the application of a marking potential to a contact for relatively moving the brushes with respect to the contacts toward a position to straddle the marked contact.

2. A selector switch arrangement comprising a loop of series-connected alternately-occurring contacts and resistors, the contacts being placed side by side in a circle and the resistors all having substantially the same value, a source of reference potential, a group of second resistors each being equal in resistance value to all the other second resistors and connected between a different respective one of said contacts and said source of reference potential, means for selectively generating separate potentials including a marking potential, a group of rectifiers, one end of each of said rectifiers being coupled to a respective one of said contacts, the other end of each of said rectifiers being coupled to said means for generating separate potentials to receive one of said potentials, the value of said source of reference potential being selected to permit only said rectifier to which said marking potential is applied to be conductive whereby a marking potential is applied to the contact to which said conductive rectifier is coupled, a pair of selector brushes rotatably disposed with respect to the center of the circle formed by said contacts with sufficient angular separation between them for simultaneously engaging respective non-adjacent ones of the contacts, control means responsive to the application of a marking potential to a contact for rotating the brushes in unison to hunt around the circle toward the position in which the brushes straddle the marked contact in which position a particular one of the brushes is at a shorter angular distance from the contact as measured from the brush to the contact in a clockwise direction than as thus measured in a counter clockwise direction.

3. A selector switch arrangement comprising a loop of series-connected alternately-occurring contacts and resistors, the contacts being placed side by side in a circle and the resistors all having substantially the same value, means for applying a reference potential to each one of said contacts, said means including a group of second resistors each being equal in resistance value to all the others and connected between a different respective one of said contacts and ground, means for applying a marking potential to any of said contacts, a pair of selector brushes rotatably carried within the circle with sufficient angular separation between them for simultaneously engaging respective non-adjacent ones of the contacts, means responsive when said marking potential is applied to one of the contacts for rotating the brushes in unison to hunt in either direction around the circle of contacts toward a position where one of them is on one side of the marked contact and is angularly distant therefrom by one half of said angular separation and the other is on its opposite side.

4. The selector switch arrangement as described in claim 3 in which said last-mentioned means is unresponsive if, at the time when the marking potential is applied to a contact, said one and said other brushes are respectively on said opposite and said one sides thereof, and including means responsive if this condition exists when said marking potential is applied to start the rotation of the brushes until said last-mentioned means does becomes responsive.

5. The selector switch arrangement described in claim 4 in which the added means recited in that claim comprises a pair of arcuate brushes rotatably carried within the circle on opposite sides thereof for respectively engaging two contacts oppositely positioned in said circle, each arcuate brush being positioned with equal angular separation from each selector brush, and a polarized relay coupled across the arcuate brushes and responsive to the voltage difference therebetween when said condition exists, and the selector switch arrangement further includes means for disabling the polarized relay when the means for rotating the selector brushes becomes responsive.

6. A selector switch arrangement comprising a plurality of contacts placed side by side in a circle, an equal plurality of impedance devices all having at least approximately the same impedance value, means for interconnecting each two adjacent contacts over a different one of the impedance devices, means for applying a reference potential to each of said contacts including an equal plurality of second impedance devices having among themselves approximately equal values of impedance, each of said contacts being connected to ground over a different one of said second impedance devices, means for applying a marking potential to one of said contacts to produce voltage gradients around both sides of the circle of said contacts from said one contact to the contact opposite it in the circle, a pair of selector brushes, a support rotatably carrying the brushes with angular separation so that they can respectively engage simultaneously two non-adjacent ones of said contacts, means for rotating said support to cause said brushes to hunt in unison in either direction around the circle of contacts to the one of two possible positions in which they straddle the marked contact in which one position the angular distance as measured from a predetermined one of the brushes to said contact is shorter in a clockwise direction than in a counter clockwise direction, a polarized relay with its magnetizing coil coupled across said selector brushes and arranged to be responsive to a potential of one polarity therebetween to actuate said means for rotating to cause said brushes to hunt in one direction and to a potential of opposite polarity to actuate said means for rotating to cause said brushes to hunt in the opposite direction.

7. A selector switch arrangement comprising a plurality of contacts placed side by side in a circle, an equal plurality of first resistors all having approximately the same value of resistance, means for interconnecting each two adjacent contacts over a different one of the resistors, means to apply reference potentials to each of said contacts including an equal plurality of second resistors having among themselves approximately equal values of resistance, each of said contacts being connected to ground over a different one of said second resistors, means for selectively generating separate potentials including a marking potential, an equal plurality of rectifiers, each of said rectifiers being connected between one of said second resistors and said selective generating means to receive a separate potential therefrom, said reference potential having a value to permit only said rectifier to which said marking potential is applied to be conductive, whereby said marking potential is applied only to the contact connected to said conductive rectifier to produce voltage gradients around both sides of the circle of contacts from the marked contact to the contact opposite to it in the circle, a pair of selector brushes, a support carrying the brushes rotatably within the circle with angular separation between them so that they can simultaneously engage two respective non-adjacent ones of said contacts, means for rotating the brushes in unison to hunt in either direction around the circle of contacts, a polarized relay with its magnetizing coil coupled across said brushes and arranged to be responsive to a potential of one polarity therebetween to actuate said last mentioned means to cause said brushes to hunt in one direction to a position to the one of two possible positions in which they straddle the marked contact in which one position the angular distance as measured from a particular one of the brushes to said contact is shorter in a clockwise than in a counter clockwise direction, and to be responsive to a potential of opposite polarity therebetween to actuate said last-mentioned means to cause said brushes to hunt in the opposite direction to said one position.

8. A selector switch arrangement comprising a loop of series-connected alternately-occurring contacts and resistors, the contacts being placed side by side in a circle and the resistors all having substantially the same value, an electronic voltage-cycle counter which comprises an input circuit and as many output terminals as the number of said contacts and is responsive to a number of cycles of input voltage to produce a predetermined marking potential on a particular one of said output terminals which corresponds to that number and also to produce other potentials on the other output terminals, said marking potential being distinguishable from said other potentials by the fact that its magnitude and theirs have opposite relationships to the magnitude of a reference potential, an individual circuit connecting each of said output terminals to one of said contacts, each individual circuit including in series a diode and a means for biasing one of the electrodes of the diode to said reference potential, the diode and biasing means of any individual circuit being arranged in it so that the diode will be cut off when any of said other potentials is applied to its output-terminal end, but will pass current when said marking potential is applied thereto, said biasing means including a group of second resistors each of which is equal in resistance value to all the others and is connected between a respective one of said contacts and ground, a pair of selector brushes rotatably carried within the circle with angular separation so that they respectively engage non-adjacent ones of said contacts, and means responsive when the counter circuit applies a marking potential to one of said contacts for rotating the brushes in unison to hunt in either direction around the circle of contacts toward a position where one of them is on one side of the marked contact and is angularly distant therefrom by one half of said angular separation and the other is on its opposite side.

9. A selector switch arrangement comprising an electrical loop of series-connected alternately-occurring contacts and resistors, the resistors all having substantially the same value, a plurality of rectifiers, means for selectively generating separate potentials, including a marking potential, one end of each of said rectifiers being coupled to one of said contacts, the other end of each of said rectifiers being coupled to said selective generating means to receive one of said separate potentials, means to apply a reference potential to all said rectifiers at said one end of a value to permit only said rectifier to which said marking potential is applied to be conductive, whereby a marking potential is applied to the contact to which said conductive rectifier is coupled, a pair of selector brushes disposed for simultaneously engaging respective non-adjacent ones of the contacts, and control means responsive to a voltage difference between the brushes due to the application of a marking potential to a contact for relatively moving the brushes with respect to the contacts toward a position to straddle the marked contact.

10. A selector switch arrangement as described in claim 2 wherein said control means includes an auxiliary pair of brushes angularly disposed with reference to said pair of selector brushes and rotatably disposed with reference to the center of the circle formed by said contacts, said auxiliary brushes being rotatable with said selector brushes, first relay means responsive to a potential difference between said auxiliary pair of brushes for energizing said control means to rotate said selector brushes and second relay means connected to said control means to hold said first relay means unresponsive when said control means are responsive to a potential applied to said selector brushes.

IGOR E. GROSDOFF.

REFERENCES CITED

The following references are of record in the file of this patent:

UNITED STATES PATENTS

| Number | Name | Date |
|---|---|---|
| 1,042,693 | Kramer | Oct. 29, 1912 |
| 1,768,966 | Tanner | July 1, 1930 |
| 2,007,577 | Lum | July 9, 1935 |